March 7, 1933. G. W. LEIMAN 1,900,571
LIQUID FEEDING DEVICE
Filed Jan. 29, 1930
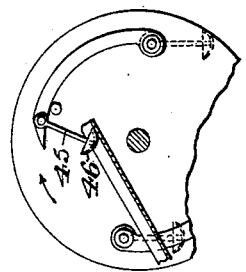
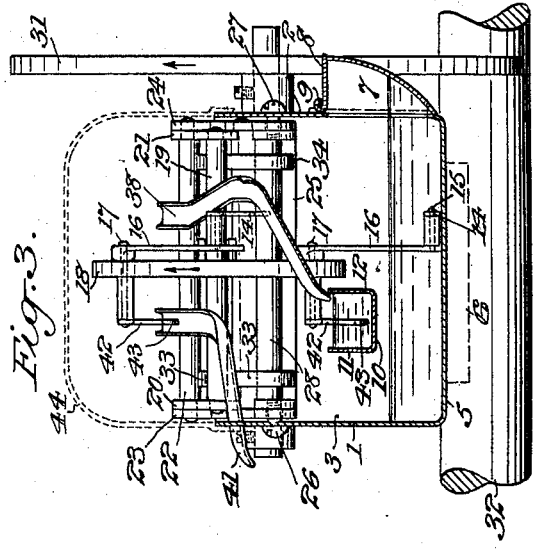
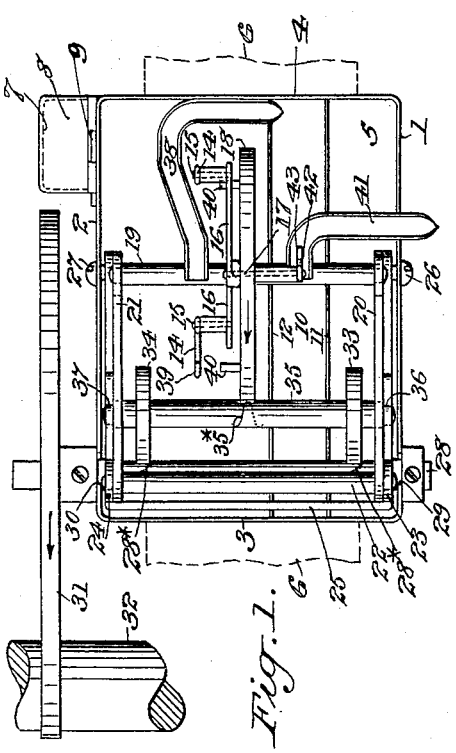
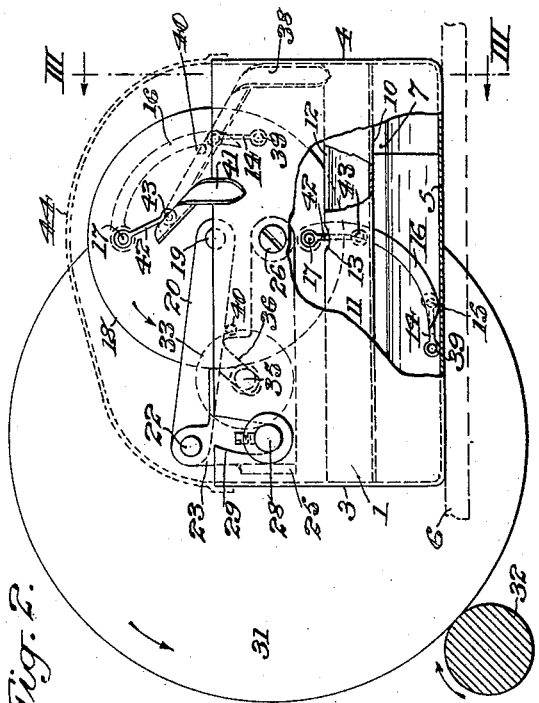
INVENTOR
George W. Leiman
BY
ATTORNEYS Patented Mar. 7, 1933

1,900,571

UNITED STATES PATENT OFFICE

GEORGE W. LEIMAN, OF NEWARK, NEW JERSEY, ASSIGNOR TO LEIMAN BROS. INC., OF NEWARK, NEW JERSEY, A CORPORATION OF NEW JERSEY

LIQUID FEEDING DEVICE

Application filed January 29, 1930. Serial No. 424,231.

This invention relates to improvements in liquid feeding devices and has for its object to provide a device which will deliver a small quantity of liquid, such as oil, to a conduit to be conveyed, by gravity to parts of a machine to be lubricated when the parts are set in motion.

Another object is to provide a device which may be applied to a machine and actuated thereby to intermittently deliver predetermined amounts of liquid to a conduit, the frequency of the deliveries being controlled by the speed of rotation of the shaft of the machine from which it receives its motion.

Another object is to provide a device which will intermittently deliver uniform quantities of liquid, said quantities of liquid being removed from an auxiliary reservoir, and means for maintaining a constant level of the liquid in the auxiliary reservoir.

Another object is to provide certain improvements in the form, construction and arrangement of the parts whereby the above named and other objects may effectively be attained.

A practical embodiment of my invention is represented in the accompanying drawing, in which Fig. 1 represents a plan view of my improved device applied to a portion of a moving shaft of a machine and from which the device is actuated.

Fig. 2 represents a side elevation of the same, a portion of the main and auxiliary reservoirs being broken away to show parts therein.

Fig. 3 represents a vertical section taken in the plane of the line III—III of Fig. 2 looking in the direction of the arrows, and Fig. 4 represents a detail section of a modified form of liquid feeder and parts adjacent thereto.

The device comprises a main reservoir having side walls denoted by 1, 2, end walls by 3, 4 and a bottom by 5. This reservoir may be secured against unintentional displacement by any suitable means, such as a platform 6 shown in dotted outline in Figs. 1 to 3 inclusive, carried by some convenient part of the machine (not shown). The wall 2 is provided with an off-set portion forming a chamber 7, which communicates with the interior of the reservoir and through which the reservoir may be supplied with liquid. This chamber 7 has a cover 8 hinged at 9 to prevent matter from entering the chamber unintentionally.

An auxiliary reservoir, in the form of a trough 10 is secured between the end walls 3, 4 and spaced from the bottom 5 of the reservoir. The longitudinal side walls 11, 12 of the trough 10 are disposed so that the upper edges will be arranged in substantially the same plane as the upper surface of the chamber 7. The side wall 11 of the trough is cut away at 13 to form an over-flow for the liquid deposited therein. The opposite wall 12 may be similarly cut away to provide an over-flow.

The liquid is transported from the main reservoir to the trough 10 by one or more feeders 14, in the present instance two are shown. Each feeder 14 is mounted to freely swing on a pin 15 fixed to the outer end of an arm 16, which is arranged to rock on a pin 17 secured in one vertical face of a circular plate 18 mounted on a shaft 19. The outer ends of the shaft 19 are journaled in arms 20, 21 secured to a rod 22 which is mounted in bearings 23, 24 uprising from a U-shaped frame 25. The ends of the U-shaped frame 25 are pivotally connected at 26, 27 to the side walls 1, 2 respectively of the main reservoir.

A shaft 28 is mounted to rotate in the frame 25 and has one end arranged to extend through a slot 29 in the side wall 1, while the other end of the shaft projects through a slot 30 in the side wall 2 of the reservoir in position to receive a disc 31, the periphery of which is arranged to frictionally engage a rotating shaft 32 of the machine (not shown).

Motion is transmitted to the circular plate 18 by means of flanges 33, 34 of a spool 35, which flanges frictionally engage the shaft 28, while the spool 35 is held in contact with the peripheral edge of the circular plate 18. The ends of the spool 35 are maintained in position in slots 36, 37 formed in the frame 25.

Thus by the rotation of the shaft 32 motion is transmitted to the disc 31 which rotates on its shaft 28 to carry motion to the flanges 33, 34 of the spool 35 which, in turn, moves the circular plate 18. By the rotation of the plate 18, each arm 16 in turn is arranged to rock on its pin 17 by gravity outwardly away from the shaft 19 and cause the feeders 14 to fall into the liquid in the main reservoir. By the further movement of the plate 18, the end of the arms and feeders will be trailed through the liquid in the reservoir and upwardly out of the liquid carrying with them a certain quantity of liquid which will cling to the ends of the arms and feeders.

In the upward movement of the arms and feeders, the feeders will be brought into engagement with the upper end of an inclined duct 38, which engagement will trail the feeders thereon and wipe the liquid from the feeders. The lower end of the duct 38 is secured to the trough 10, so that any liquid deposited therein will travel by gravity into the trough.

The free end of each feeder is also bent in the form of a loop 39 which is designed to receive and carry the liquid from the reservoir to the duct 38.

The inward movement of each of the arms 16 is limited by a pin 40 fixed in the circular plate 18, so that the feeders will be brought in proper position to be trailed and wiped upon the upper end of the duct 38.

To convey the liquid from the trough 10 to a delivery conduit 41, I provide one or more feeders 42, in the present instance two are shown, which feeders are disposed on the opposite vertical face of the circular plate 18 and arranged to swing freely on the pin 17 which extends through the plate 18. These feeders 42 are constructed similar to the feeders 14, described in the foregoing, and are arranged to pass into and out of the liquid in the trough 10 in a vertical position as the plate 18 is rotated. The feeders 42 are also provided with a loop 43 at their lower end and are disposed in position to be trailed into wiping contact with the upper end of the inclined conduit 41, so as to deliver the liquid carried thereby from the trough to the conduit. The liquid deposited in the conduit 41 may be conveyed in any well known or approved manner to various parts of the machine (not shown) as desired.

A cover 44, shown in dotted outline in Figs. 2 and 3, may be provided to conceal certain of the mechanism and also protect the liquid in the reservoir from collecting dust and dirt.

In Fig. 4, I have shown a modified form of feeder, which is provided with a shank 45 having a scoop 46 at its lower end to receive and carry the liquid from the reservoir to the trough, thereby providing for the delivery of large quantities of liquid at predetermined intervals.

From the foregoing it will be seen that the liquid will be intermittently transported from the main reservoir to the trough 10 and from the trough 10 to the conduit 41, where it may be conveyed by gravity to various parts of the machine, as desired.

Furthermore, the liquid will be delivered in small quantities at regular intervals and the frequency of the deliveries being regulated by the speed of rotation of the shaft of the machine. The device above described may be applied to machines having a shaft rotating at high speed and delivering the proper amount of liquid to the parts.

It is also to be pointed out that any undue variation or irregularity of rotation of the driving shaft will be compensated for by reason of the fact that the U-shaped frame is pivoted to the walls of the reservoir and carries the shafts of the moving parts, thereby preventing any fluctuation in the deliveries of the liquid.

In order to remove any particles of dust or dirt which may be deposited on the spool 35 at the point where the circular plate 18 contacts with the spool to receive its motion, I provide the shaft 35 with a shallow helical groove 35*, so that the friction between the plate and shaft will tend to carry any dust or dirt laterally and away from the point of contact.

Similarly the shaft 28 is provided with shallow helical grooves 28*, which are arranged to rotate between the flanges 33, 34 of the spool 35 and thereby move laterally any particles of dust or dirt which may collect on the spool 35.

It is obvious that various changes may be resorted to in the form, construction and arrangement of the several parts without departing from the spirit and scope of my invention, and hence I do not intend to be limited to the details herein shown and described except as the same are set forth in the claims.

What I claim is:

1. The combination with a rotating shaft of a machine, of a liquid feeding device comprising, a main reservoir, an auxiliary reservoir disposed above said main reservoir, means for transmitting motion from said rotating shaft to the device, a disc having its periphery in contact with said means for actuating it, at least one element pivoted on said disc and arranged to be passed into and out of the liquid in the main reservoir for removing therefrom a small quantity of liquid, a duct connected to said auxiliary reservoir and having its upper end horizontally disposed in the vertical plane of travel of said element to receive the element and liquid therefrom, at least one second element pivoted on the disc and arranged to be moved into and out of the liquid in the auxiliary reservoir, and a conduit having its upper end horizontally disposed in the vertical plane of travel of said second element to receive the element and liquid carried thereby from the auxiliary reservoir.

2. The combination with a rotating shaft of a machine, of a liquid feeding device comprising, a main reservoir, an auxiliary reservoir disposed above said main reservoir, means for transmitting motion from said rotating shaft to the device, a disc having its periphery in contact with said means for actuating it, at least one arm pivoted on said disc, an element loosely mounted on the free end of said arm and arranged to be passed into and out of the liquid in the main reservoir for removing therefrom a small quantity of liquid, a duct connected to said auxiliary reservoir and having its upper end horizontally disposed in the vertical plane of travel of said element to receive the element and liquid therefrom, at least one second element pivoted on the disc and arranged to be moved into and out of the liquid in the auxiliary reservoir, and a conduit having its upper end horizontally disposed in the vertical plane of travel of said second element to receive the element and liquid carried thereby from the auxiliary reservoir.

3. The combination with a rotating shaft of a machine, of a liquid feeding device comprising, a main reservoir, an auxiliary reservoir disposed above said main reservoir, rotatable means for transmitting motion from said rotating shaft to the device, a disc having its periphery in contact with said rotatable means for actuating it, at least one element pivoted on said disc and arranged to be passed into and out of the liquid in the main reservoir for removing therefrom a small quantity of liquid, a duct connected to said auxiliary reservoir and having its upper end horizontally disposed in the vertical plane of travel of said element to receive the element and liquid therefrom, at least one second element pivoted on the disc and arranged to be moved into and out of the liquid in the auxiliary reservoir, and a conduit having its upper end horizontally disposed in the vertical plane of travel of said second element to receive the element and liquid carried thereby from the auxiliary reservoir.

4. The combination with a rotating shaft of a machine, of a liquid feeding device comprising a main reservoir, an auxiliary reservoir disposed above said main reservoir, rotatable means for transmitting motion from said rotating shaft to the device, a disc having its periphery in contact with said rotatable means for actuating it, at least one arm pivoted on said disc, an element loosely mounted on the free end of said arm and arranged to be passed into and out of the liquid in the main reservoir for removing therefrom a small quantity of liquid, a duct connected to said auxiliary reservoir and having its upper end horizontally disposed in the vertical plane of travel of said element to receive the element and liquid therefrom, at least one second element pivoted on the disc and arranged to be moved into and out of the liquid in the auxiliary reservoir, and a conduit having its upper end horizontally disposed in the vertical plane of travel of said second element to receive the element and liquid carried thereby from the auxiliary reservoir.

5. The combination with a rotating shaft of a machine, of a liquid feeding device comprising, a main reservoir, an auxiliary reservoir disposed above said main reservoir, frictionally driven rotatable means for transmitting motion from the rotating shaft to the device, a disc having its periphery in contact with said rotatable means for actuating it, at least one element pivoted on said disc and arranged to be passed into and out of the liquid in the main reservoir for removing therefrom a small quantity of liquid, a duct connected to said auxiliary reservoir and having its upper end horizontally disposed in the vertical plane of travel of said element to receive the element and liquid therefrom, at least one second element pivoted on the disc and arranged to be moved into and out of the liquid in the auxiliary reservoir, and a conduit having its upper end horizontally disposed in the vertical plane of travel of said second element to receive the element and liquid carried thereby from the auxiliary reservoir.

6. The combination with a rotating shaft of a machine, of a liquid feeding device comprising, a main reservoir, an auxiliary reservoir disposed above said main reservoir, frictionally driven rotatable means for transmitting motion from the rotating shaft to the device, a disc having its periphery in contact with said rotatable means for actuating it, at least one arm pivoted on the disc, an element loosely mounted on the free end of said arm and arranged to be passed into and out of the liquid in the main reservoir for removing therefrom a small quantity of liquid, a duct connected to said auxiliary reservoir and having its upper end horizontally disposed in the vertical plane of travel of said element to receive the element and liquid therefrom, at least one second element pivoted on the disc and arranged to be moved into and out of the liquid in the auxiliary reservoir, and a conduit having its upper end horizontally disposed in the vertical plane of travel of said second element to receive the element and liquid carried thereby from the auxiliary reservoir.

In testimony, that I claim the foregoing as my invention, I have signed my name this 27th day of January, 1930.

GEORGE W. LEIMAN.